(12) United States Patent
Mitchell et al.

(10) Patent No.: US 9,987,572 B2
(45) Date of Patent: Jun. 5, 2018

(54) FILTER ASSEMBLY AND A REFRIGERATOR APPLIANCE

(71) Applicant: Haier US Appliance Solutions, Inc., Wilmington, DE (US)

(72) Inventors: Alan Joseph Mitchell, Louisville, KY (US); Bart Andrew Nuss, Fisherville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 178 days.

(21) Appl. No.: 15/205,034

(22) Filed: Jul. 8, 2016

(65) Prior Publication Data
US 2018/0008914 A1    Jan. 11, 2018

(51) Int. Cl.
| | | |
|---|---|---|
| *B01D 29/96* | (2006.01) | |
| *F25D 11/02* | (2006.01) | |
| *B01D 35/02* | (2006.01) | |
| *B01D 35/143* | (2006.01) | |
| *F25D 23/02* | (2006.01) | |
| *F25D 23/12* | (2006.01) | |
| *B01D 35/30* | (2006.01) | |

(52) U.S. Cl.
CPC ............ *B01D 29/96* (2013.01); *B01D 35/02* (2013.01); *B01D 35/143* (2013.01); *B01D 35/306* (2013.01); *F25D 11/02* (2013.01); *F25D 23/028* (2013.01); *F25D 23/12* (2013.01); *B01D 2201/167* (2013.01); *C02F 2201/006* (2013.01); *C02F 2307/12* (2013.01); *F25D 2323/021* (2013.01); *F25D 2323/121* (2013.01)

(58) Field of Classification Search
CPC ... F25D 2323/121; B01D 29/96; B01D 35/02; B01D 35/30; B01D 35/306; B01D 35/143; B01D 2201/167; B01D 2201/301–2201/303; C02F 1/00; C02F 2201/006; C02F 2307/12; B23P 19/04; Y10T 29/53
USPC .......................................... 210/232, 234–236
See application file for complete search history.

(56) References Cited

U.S. PATENT DOCUMENTS

| | | | |
|---|---|---|---|
| 4,698,164 A | 10/1987 | Ellis | |
| 7,138,053 B2 * | 11/2006 | Sato ....................... | B01D 29/96 210/232 |
| 8,627,675 B2 | 1/2014 | Kruckenberg et al. | |
| 2015/0114896 A1 * | 4/2015 | Lam ........................ | B01D 35/30 210/236 |
| 2016/0354715 A1 * | 12/2016 | Bippus .................... | B23P 19/04 |

* cited by examiner

*Primary Examiner* — Terry K Cecil
(74) *Attorney, Agent, or Firm* — Dority & Manning, P.A.

(57) ABSTRACT

A filter assembly includes a manifold having an inlet and outlet port. The filter assembly further includes a filter cartridge. The filter cartridge includes a casing and a filter casing disposed within the casing. The filter cartridge also includes a gear rack, and an inlet and outlet port. The filter assembly further includes an electric motor configured to move the filter cartridge along an axial direction by rotating a gear coupled to the electric motor such that the gear meshes with the gear rack. The filter cartridge is movable between a first position in which the filter cartridge and manifold are not in fluid communication, and a second position in which the filter cartridge and the manifold are in fluid communication. A refrigerator appliance having the filter assembly is also provided.

20 Claims, 11 Drawing Sheets

FILTER ASSEMBLY AND A REFRIGERATOR APPLIANCE

FIELD OF THE INFORMATION

The present subject matter relates generally to filter assemblies, such as filter assemblies for refrigerator appliances.

BACKGROUND OF THE INVENTION

Certain refrigerator appliances include water filter assemblies for filtering water. Water filter assemblies can filter water entering the refrigerator appliances in order to provide filtered water to various refrigerator appliance components, such as an ice maker and/or a water dispenser. Such filtering can improve a taste and/or an appearance of water within the refrigerator appliances.

Certain water filter assemblies include a manifold and a filter cartridge. The manifold is mounted to a cabinet of the refrigerator appliance and directs unfiltered water into the filter cartridge and filtered water out of the filter cartridge. The filter cartridge includes a filter media, such as an activated carbon block, a pleated polymer sheet, a spun cord material, or a melt blown material. The filter media is positioned within the filter cartridge and filters water passing therethrough.

Over time, the filter media will lose effectiveness. For example, pores of the filter media can become clogged or the filter media can become saturated with contaminants. To ensure that the filter media has not exceeded its filtering capacity, the filtering media is preferably replaced or serviced at regular intervals regardless of its current performance. To permit replacement or servicing of the filter media or the filter cartridge, the filter cartridge is generally mounted to the manifold using a quick disconnect system.

However, removing the filter cartridge can be a rather difficult task, because, for example, a user must pull the filter cartridge with an amount of force sufficient to overcome frictional forces caused by seal members of the filter cartridge rubbing against an inner wall of the manifold. Installing the filter cartridge also proves difficult, because, for example, the user must push the filter cartridge with an amount of force sufficient to not only compress seal members of the filter cartridge, but also actuate one or more check valves of the manifold.

Accordingly, a water filter with features for assisting with removal and insertion of the filter cartridge would be useful.

BRIEF DESCRIPTION OF THE INVENTION

Aspects and advantages of the invention will be set forth in part in the following description, or may be obvious from the description, or may be learned through practice of the invention.

In one exemplary embodiment, the present disclosure provides a filter assembly. The filter assembly may include a manifold having an inlet port and an outlet port. In addition, the filter assembly may further include a filter cartridge. The filter cartridge may include a casing and a filter casing disposed within the casing. The filter cartridge may also include a gear rack, and an inlet and outlet port. Additionally, the filter assembly may further include an electric motor configured to move the filter cartridge along an axial direction by rotating a gear coupled to the electric motor such that the gear meshes with the gear rack. Further, the filter cartridge may be movable between a first and second position along the axial direction. In the first position, the filter cartridge may be spaced apart from the manifold such that the filter cartridge is not in fluid communication with the manifold. In the second position, the filter cartridge and manifold are in fluid communication.

In another exemplary embodiment, the present disclosure provides a refrigerator appliance. The refrigerator appliance may include a cabinet defining a chilled chamber, and a filter assembly may be mounted to the cabinet. The filter assembly may include a manifold having an inlet port and an outlet port. In addition, the filter assembly may further include a filter cartridge. The filter cartridge may include a casing and a filter casing disposed within the casing. The filter cartridge may also include a gear rack, and an inlet and outlet port. Additionally, the filter assembly may further include an electric motor configured to move the filter cartridge along an axial direction by rotating a gear coupled to the electric motor such that the gear meshes with the gear rack. Further, the filter cartridge may be movable between a first and second position along the axial direction. In the first position, the filter cartridge may be spaced apart from the manifold such that the filter cartridge is not in fluid communication with the manifold. In the second position, the filter cartridge and manifold are in fluid communication.

In yet another exemplary embodiment, the present disclosure provides a method for replacing a filter cartridge of a refrigerator appliance. The method may include receiving an interrupt from an input device operatively coupled to a controller that is configured to move the filter cartridge in response to the interrupt. The controller may be operatively coupled to an electric motor configured to move the filter cartridge along an axial direction, and the method may further include moving the filter cartridge along the axial direction to a first position in which the filter cartridge is spaced apart from a manifold of the refrigerator appliance that was previously in fluid communication with the filter cartridge. In addition, the method may further include detecting a parameter indicating insertion of a replacement filter cartridge, wherein the controller may be operatively coupled to a sensor positioned along the axial direction and configured to generate the parameter in response to movement of the replacement filter cartridge toward the manifold along the axial direction. Further, in response to detecting the parameter indicating insertion of the replacement filter cartridge, the controller may activate the electric motor, and the method may further include advancing the replacement filter cartridge along the axial direction to a second position in which the filter cartridge is in fluid communication with the manifold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
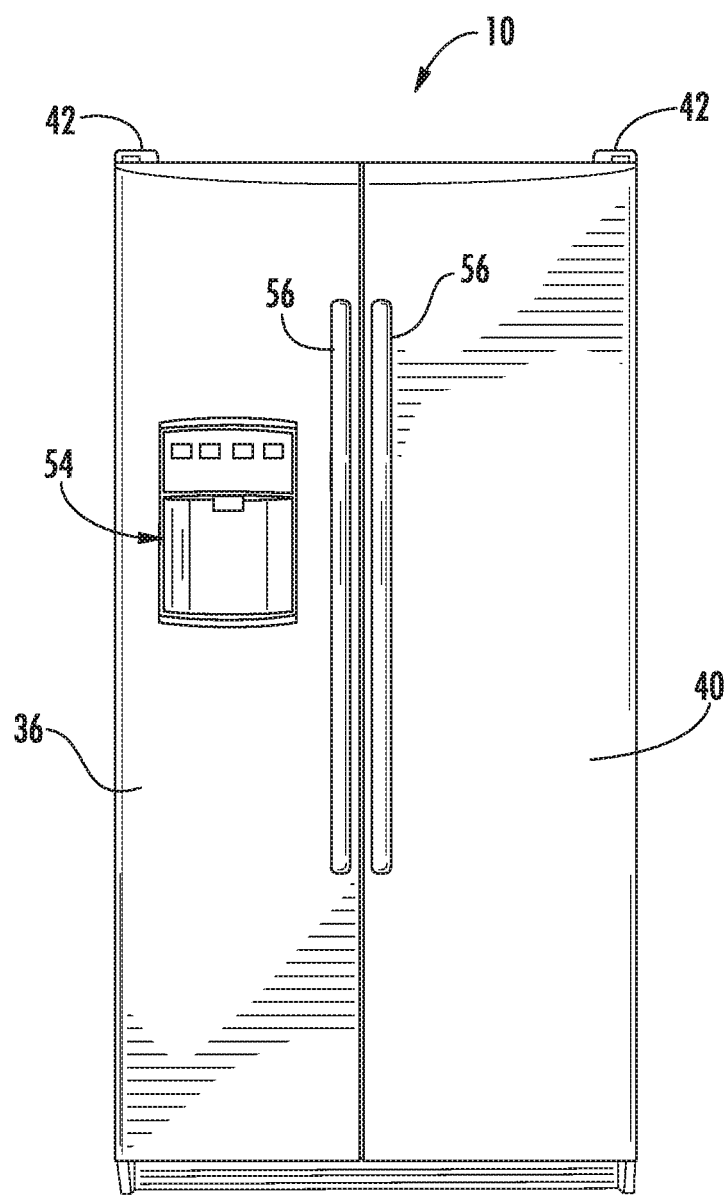
FIG. 1 provides a perspective view of a refrigerator appliance accord to an exemplary embodiment of the present subject matter with doors of the exemplary refrigerator appliance shown closed.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Figure 2:
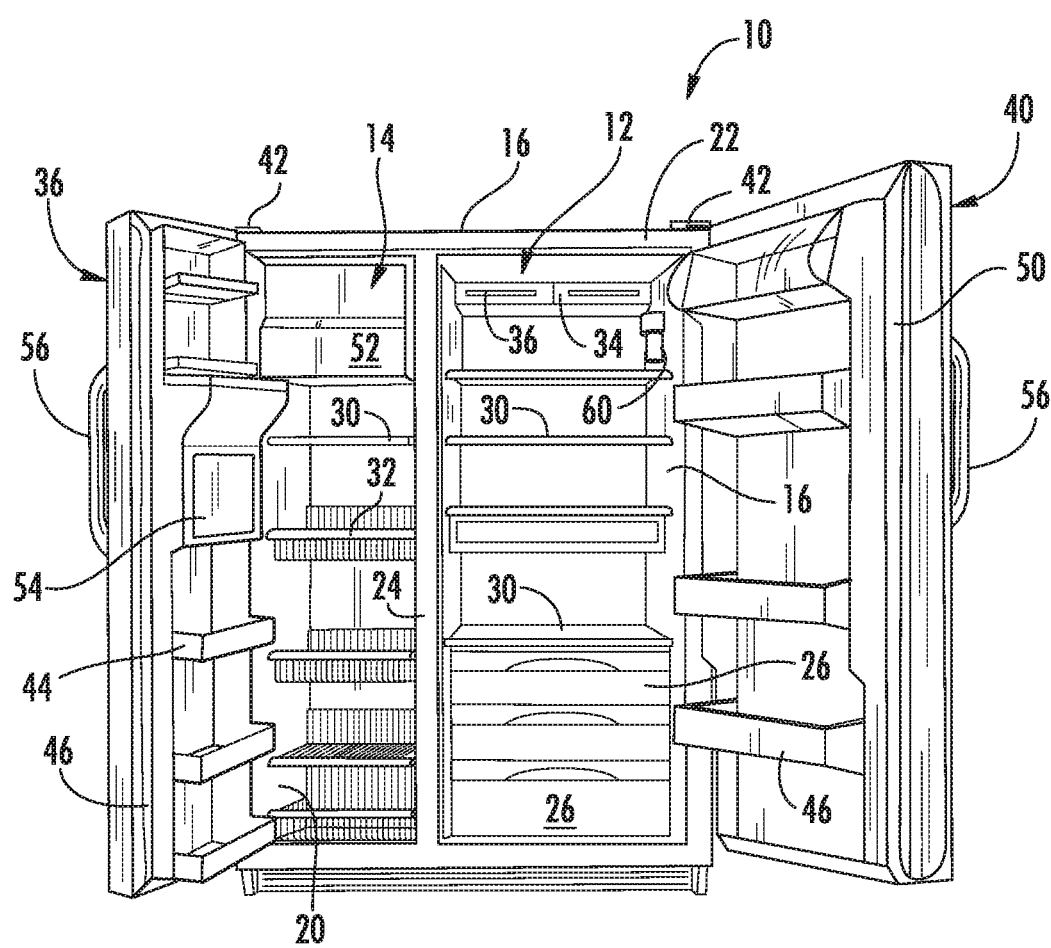
FIG. 2 provides a perspective view of the exemplary refrigerator appliance with doors of the exemplary refrigerator appliance shown open.

Referring now to the drawings, FIGS. 1 and 2 depict a refrigerator appliance 10 according to an exemplary embodiment of the present disclosure. Refrigerator appliance 10 may include a filter assembly 60 that includes features for facilitating maintenance and/or servicing of filter assembly 60. It should be appreciated that refrigerator appliance 10 is provided for illustrative purposes only and that the present disclosure is not limited to any particular type, style, or configuration of refrigeration appliance, and may be used in or with any manner of refrigerator, freezer, refrigerator/freezer combination, and so forth.

As shown in FIG. 2, refrigerator appliance 10 includes a fresh food storage compartment 12 and a freezer storage compartment 14, with the compartments arranged side-by-side and contained within an outer case 16 and inner liners 18 and 20 generally molded from a suitable plastic material. Thus, refrigerator appliance 10 is generally referred to as a side-by-side style refrigerator appliance. In alternative exemplary embodiments, refrigerator appliance 10 may include a single liner to divide it into freezer storage compartment 14 and fresh food storage compartment 12. Outer case 16 is normally formed by folding a sheet of a suitable material, such as pre-painted steel, into an inverted U-shape to form top and side walls of outer case 16. A bottom wall of outer case 16 is normally formed separately and attached to the case side walls and to a bottom frame that provides support for refrigerator appliance 10.

A breaker strip 22 extends between a case front flange and outer front edges of inner liners 18 and 20. Breaker strip 22 is formed from a suitable resilient material, such as an extruded acrylonitrile butadiene styrene based material (commonly referred to as ABS). The insulation in the space between inner liners 18 and 20 is covered by another strip of suitable resilient material, which is also commonly referred to as a mullion 24 and may be formed of an extruded ABS material. Breaker strip 22 and mullion 24 form a front face, and extend completely around inner peripheral edges of outer case 16 and vertically between inner liners 18 and 20.

Slide-out drawers 26, a storage bin 28 and shelves are normally provided in fresh food storage compartment 12 to support items being stored therein. In addition, at least one shelf 30 and at least one wire basket 32 are also provided in freezer storage compartment 14.

Refrigerator appliance 10 features are regulated with a controller 34 according to user preference via manipulation of a control interface 36 mounted in an upper region of fresh food storage compartment 12 and coupled to controller 34. As used herein, the term "controller" is not limited to just those integrated circuits referred to in the art as microprocessor, but broadly refers to computers, processors, specific integrated circuits, and other programmable circuits, and these terms are used interchangeably herein.

A freezer door 38 and a fresh food door 40 close access openings to freezer storage compartment 14 and fresh food storage compartment 12. Freezer door and fresh food door 38 and 40 are each mounted by a top hinge 42 and a bottom hinge (not shown) to rotate about its outer vertical edge between an open position, as shown in FIG. 1, and a closed position. Freezer door 38 may include a plurality of storage shelves 44 and a sealing gasket 46, and fresh food door 40 also includes a plurality of storage shelves 48 and a sealing gasket 50.

Freezer storage compartment 14 may include an automatic ice maker 52 and a dispenser 54 provided in freezer door 38 such that ice and/or chilled water can be dispensed without opening freezer door 38, as is well known in the art. Freezer door 38 and fresh food door 40 may be opened by handles 56.

Refrigerator appliance 10 also includes filter assembly 60 for filtering water coming into refrigerator appliance 10 from a water supply (not shown), such as a municipal water source or a well. Filter assembly 60 can remove contaminants such as chlorine, chloroform, lead, arsenic, pharmaceuticals, microbes, and/or other undesirable substances from water supplied to refrigerator appliance 10. In particular, filter assembly 60 can supply filtered water to ice maker 52 and/or dispenser 54. As will be understood and used herein, the term "water" includes purified water and solutions or mixtures containing water and, e.g., elements (such as calcium, chlorine, and fluorine), salts, bacteria, nitrates, organics, and other chemical compounds or substances, e.g., prior to filtering with filter assembly 60.

As with known refrigerators, refrigerator appliance 10 also includes a machinery compartment (not shown) that at least partially contains components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to direct cool the ice maker 52 to form ice cubes, and a heating loop can be added to help remove ice from the ice maker 52. Collectively, the vapor compression cycle components in a refrigeration circuit, associated fans, and associated compartments are conventionally referred to as a sealed system. The construction and operation of the sealed system are well known to those skilled in the art.

Figure 3:
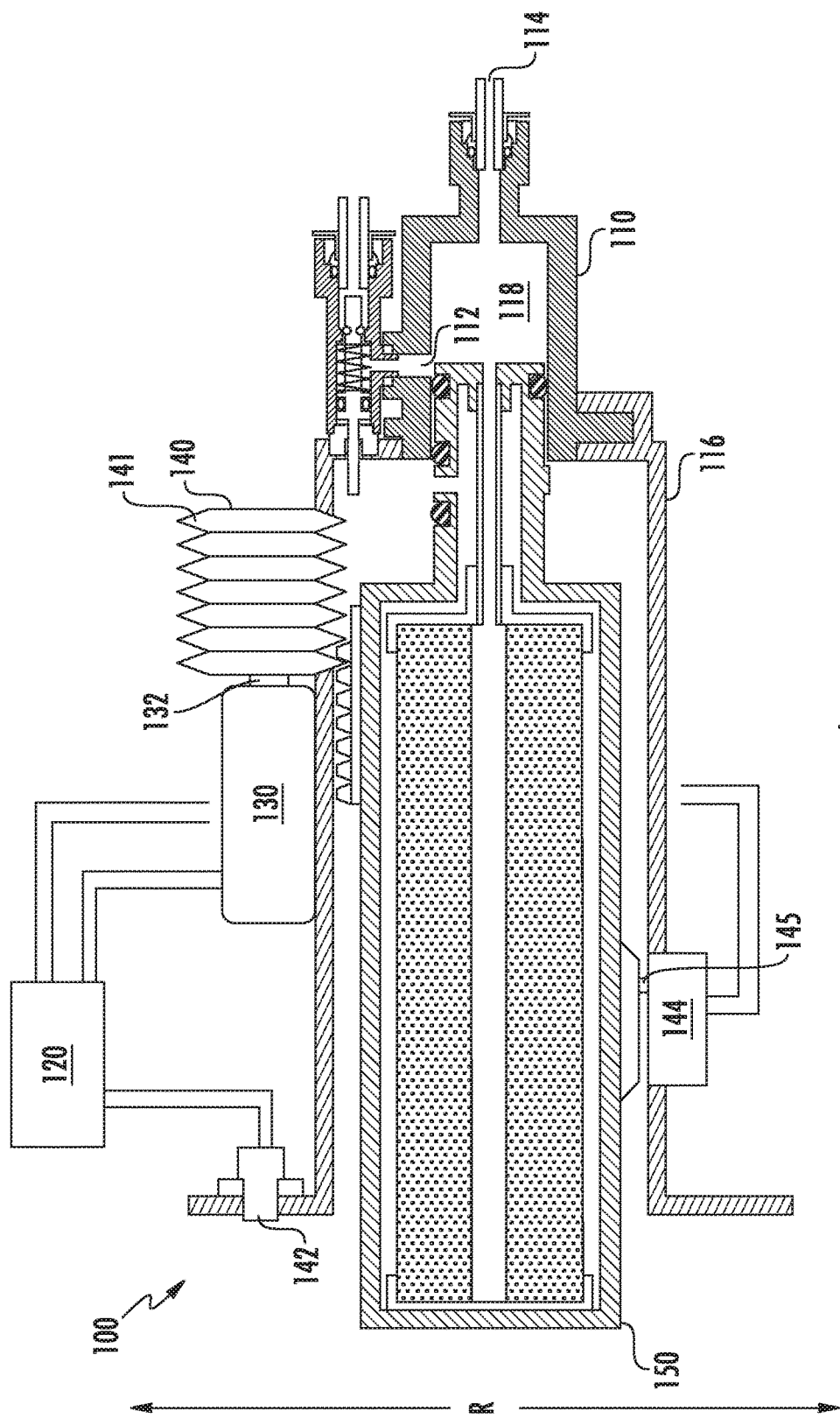
FIG. 3 provides a sectional view of a filter assembly according to an exemplary embodiment of the present disclosure.

FIG. 3 provides a sectional view of a filter assembly 100 according to an exemplary embodiment of the present subject matter. As an example, filter assembly 100 may be utilized in refrigerator appliance 10 as filter assembly 60. Thus, filter assembly 100 is described in greater detail below in the context of refrigerator appliance 10. In alternative exemplary embodiments, filter assembly 100 may be used in any other suitable appliance such as an ice maker. As discussed in greater detail below, filter assembly 100 includes features for automating removal and insertion of a filter cartridge 150.

FIG. 3 depicts a filter assembly 100 that includes a manifold 110 and filter cartridge 150. Manifold 110 includes an inlet 112 and an outlet 114 such that water from a water supply (not shown) positioned upstream from manifold 110 may flow through manifold 110 via inlet and outlet 112 and 114. Manifold 110 also defines a cavity 118 to receive at least a portion of filter cartridge 150. Filter cartridge 150 may be mounted to manifold 110 in order to filter water passing through manifold 110. As a filter capacity of filter cartridge 150 decreases or at regular intervals, filter cartridge 150 may be changed in order to ensure continuous, effective filtering of water flowing through manifold 110.

Filter assembly 100 may further include a controller 120 and an electric motor 130. Controller 120 may include a memory and microprocessor, such as a general or special purpose microprocessor operable to execute programming instructions or micro-control code. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 36 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

In some embodiments, electric motor 130 is a reversible electric motor configured to rotate an output shaft 132 of electric motor 130 in two, opposite directions. Further, a gear 140 may be coupled to output shaft 132 such that gear 140 may be rotated in either of the two, opposite directions by electric motor 130. Still further, electric motor 130 may be operatively coupled to controller 120 such that controller 120 may selectively activate electric motor 130, e.g., in response to an interrupt or signal received from an input device 142 or sensor 144 of filter assembly 100. Input device 142 and sensor 144 may be operatively coupled to controller 120 via a wired or wireless connection. In one exemplary embodiment, input device 142 is a push-button switch, and controller 120 receives an interrupt from input device 142 each time a user presses the push button. Further, upon receiving the interrupt, controller 120 may activate electric motor 130 to rotate gear 140 in one of the two, opposite directions. In other exemplary embodiments, input device 142 may be another input suitable to signal controller 120, such as a touch screen display, touch sensor, switch, etc.

As shown, sensor 144 includes a plunger 145, and generates an interrupt while plunger 145 is depressed by filter cartridge 150 moving along an axial direction A. Further, while receiving the interrupt from sensor 144, controller 120 activates electric motor 130 to rotate gear 140 in one of the two, opposite directions. Still further, although sensor 144 is shown as a mechanical switch having plunger 145, one of ordinary skill in the art having the benefit of the present disclosure will understand that sensor 144 may include any electrical, mechanical, or optical sensor that may be configured to detect filter cartridge 150 moving along axial direction A.

Referring now to FIGS. 4-6 and 10, sectional views of filter cartridge 150 are provided. As shown, filter cartridge 150 has a cylindrical shape and includes a casing 152 defining a cavity 154. Casing 152 may also include a neck and body portion 156, 158. Neck portion 156 may define an inlet 160 and an outlet 162 such that water flowing from manifold 110 may enter and exit cavity 154 through inlet 160 and outlet 162, respectively, at neck portion 156. Neck portion 156 may also define a first and second recess 164, 166 (same recess) for seal members 200, 202 (same seal) that ensure water flowing from manifold 110 enters inlet 160. In one embodiment, seal members 200 and 202 are formed from rubber, and are overmolded to an outer surface 153 of casing 152. In addition, neck portion 156 may also define a circumferential groove 168 extending around an outer surface 153 of casing 152. As an example, in some embodiments an O-ring seal 204 may be placed within circumferential groove 168.

Filter cartridge 150 also includes a filter medium 170 disposed within cavity 154. Filter medium 170 includes an interior surface 172 and exterior surface 174. In the embodiment shown, filter medium 170 has a cylindrical cross-section, and interior surface 172 is spaced inward from exterior surface 174 along a radial direction R that is perpendicular to axial direction A. In addition, filter medium 170 defines a filtered volume 176 encircled by interior surface 174 of filter medium 170.

Figure 6:
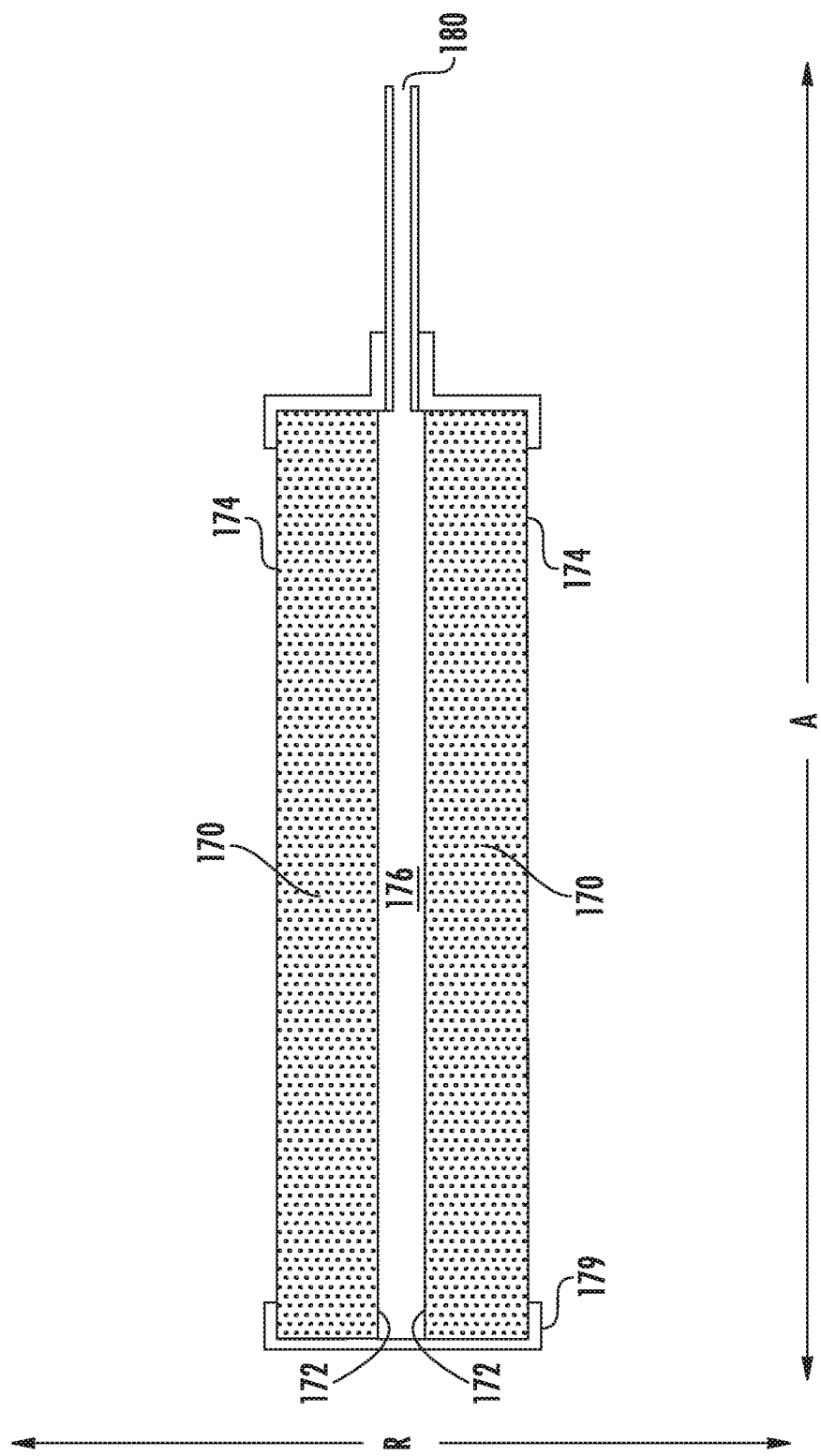
FIG. 6 provides a sectional view of a filter medium of the exemplary filter cartridge shown in FIG. 4.

As discussed below in more detail, water flowing into cavity 154 through inlet 160 enters an unfiltered volume 178. Water in unfiltered volume 178 flows or passes through filter medium 170 into filtered volume 176. Filter medium 170 removes debris, particles, etc. from water passing through filter medium 170 from unfiltered volume 178 to filtered volume 176. As shown in FIG. 6, filtered water in filtered volume 176 flows along axial direction A towards an outlet 180 of filter medium 170. Also, a cap 179 may be placed over a distal end of filter medium 170 relative to outlet 180 in order to ensure filtered water in filtered volume 176 flows towards outlet 180. Outlet 180 of filter medium 170 may be in fluid communication with outlet 162 of casing 152 such that filtered water may exit filter cartridge 150.

Figure 4:
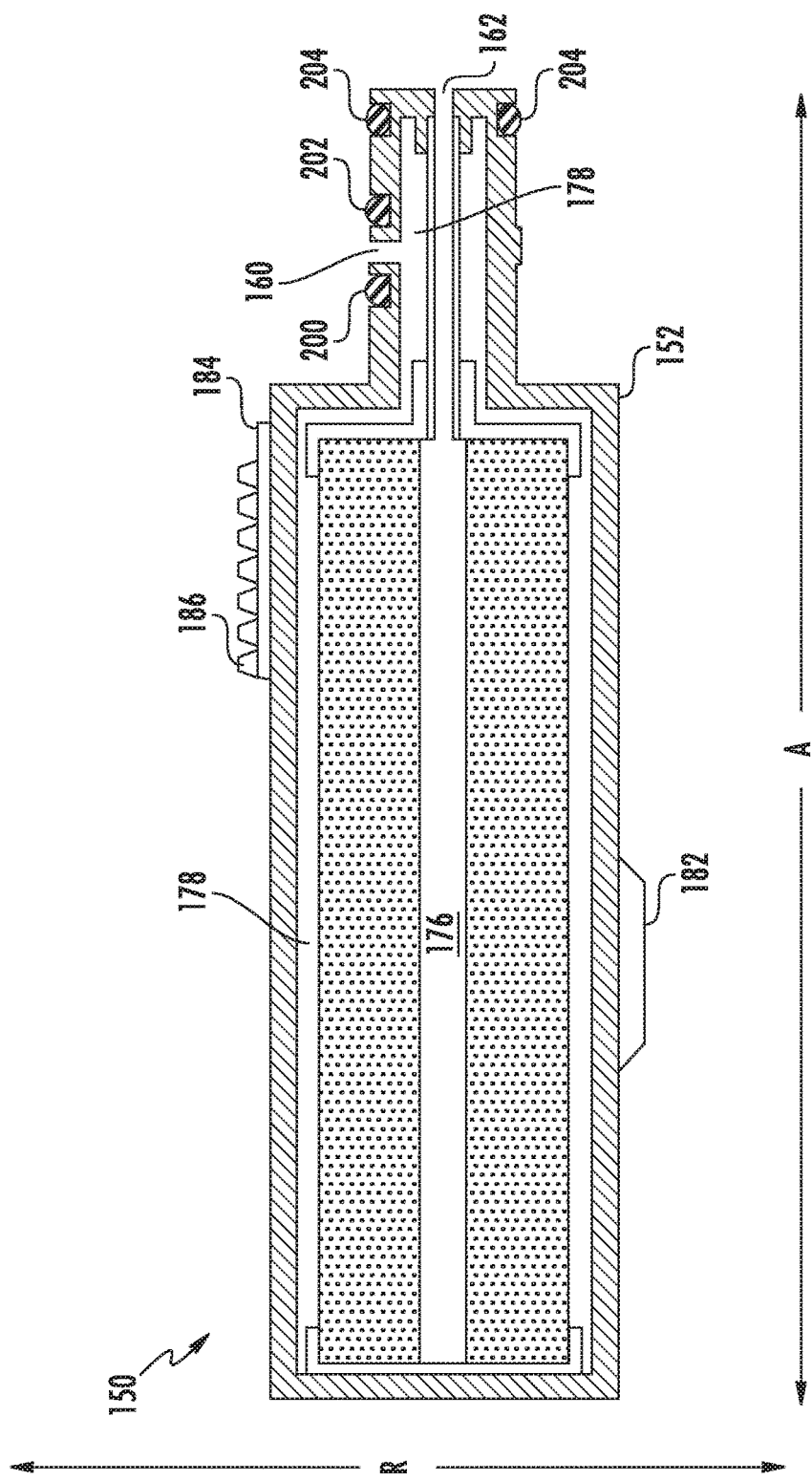
FIG. 4 provides a sectional view of a filter cartridge according to an exemplary embodiment of the present disclosure.
Figure 5:
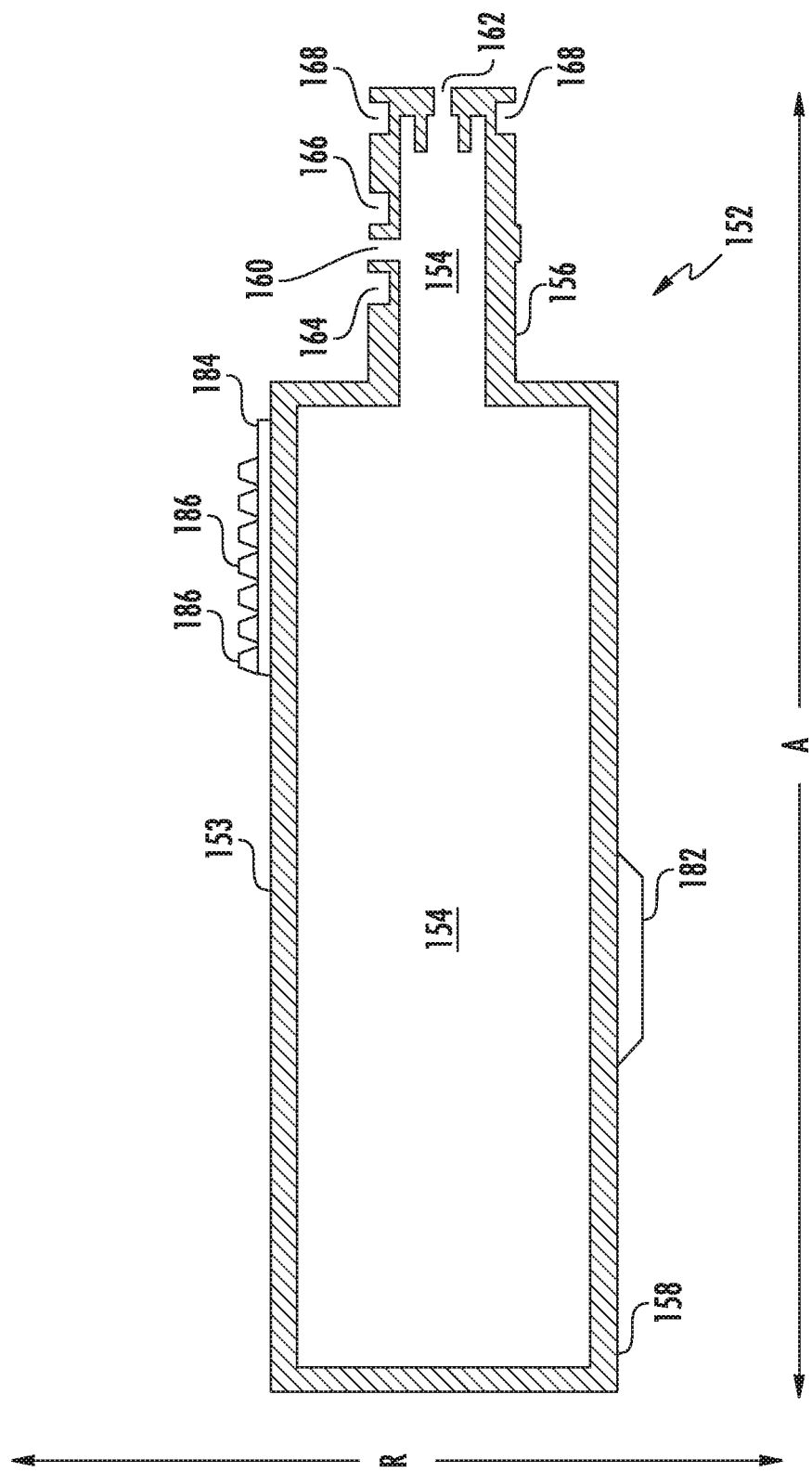
FIG. 5 provides a sectional view of a casing of the exemplary filter cartridge shown in FIG. 4.
Figure 10:
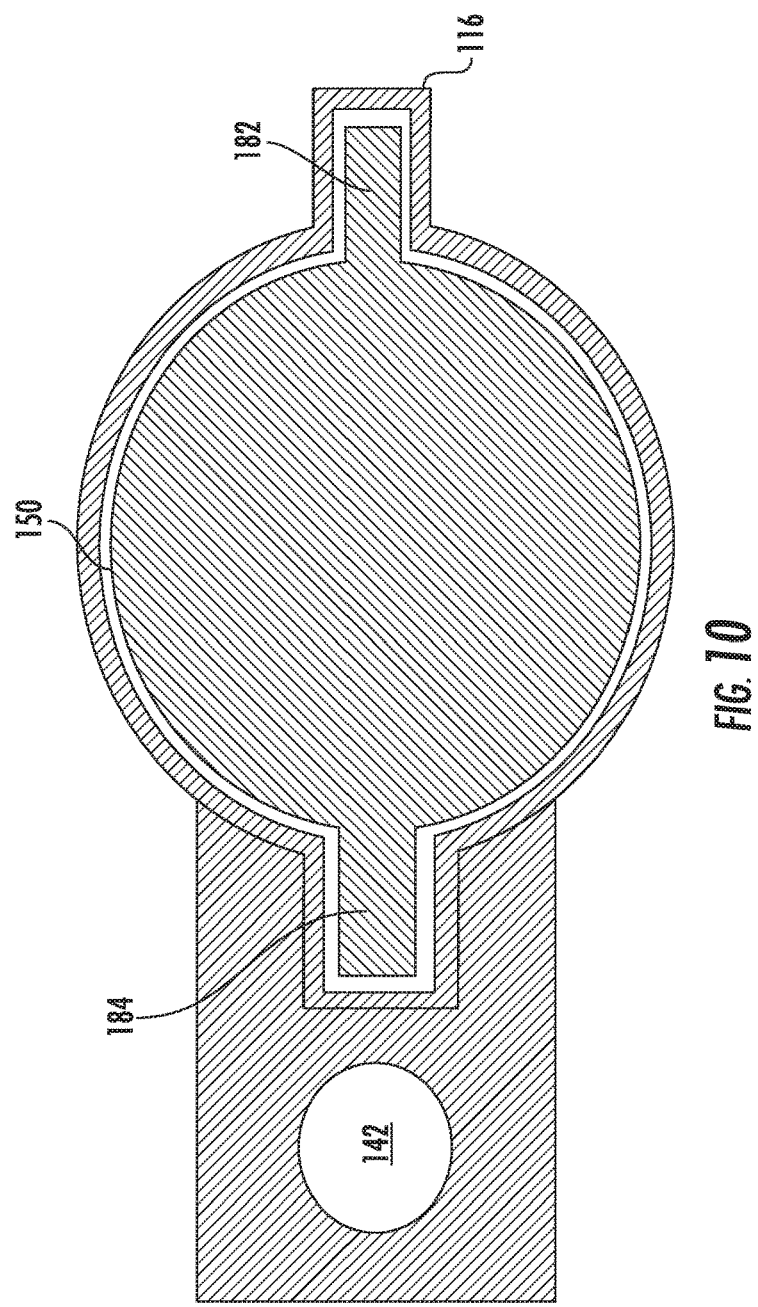
FIG. 10 provides a front view of the exemplary filter assembly of FIG. 3.

Filter cartridge 150 may also include a raised portion 182 that extends outward from outer surface 153 of casing 152 along radial direction R. As shown in FIGS. 4 and 5, raised portion 182 has a trapezoidal cross-section, however, it is understood that raised portion 182 may define other shapes such as, without limitation, a rectangle, circle, triangle, or any other similar shape. Filter cartridge 150 may also include a gear rack 184 having a plurality of teeth 186 spaced apart along axial direction A. Gear rack 184 may be positioned on or at outer surface 183 of casing 152. In particular, gear rack 184 may be integrally formed with casing 152 such that gear rack 184 is formed from or with the same material as casing 152, in certain exemplary embodiments. As discussed below in more detail, gear 140 may be a worm having a plurality of spiral teeth 141 spaced along axial direction A or a single spiral tooth. Further, gear 140 may be disposed within an opening formed in housing 116, and teeth 141 of gear 140 may, depending on position of filter cartridge 150 along axial direction A, mesh with one or more teeth 186 of gear rack 184 mounted to outer surface 153 of casing 152. As shown in FIG. 10, raised portion 182 and gear rack 184 may be positioned opposite each other on casing 152. In addition, raised portion 182 and gear rack 184 may be keyed or sized relative to each other such that filter cartridge 150 is oriented to properly engage manifold 110, e.g., or that requires filter cartridge 150 to be oriented in a single orientation relative to manifold 110 to connect filter cartridge 150 to manifold 110.

Figure 7:
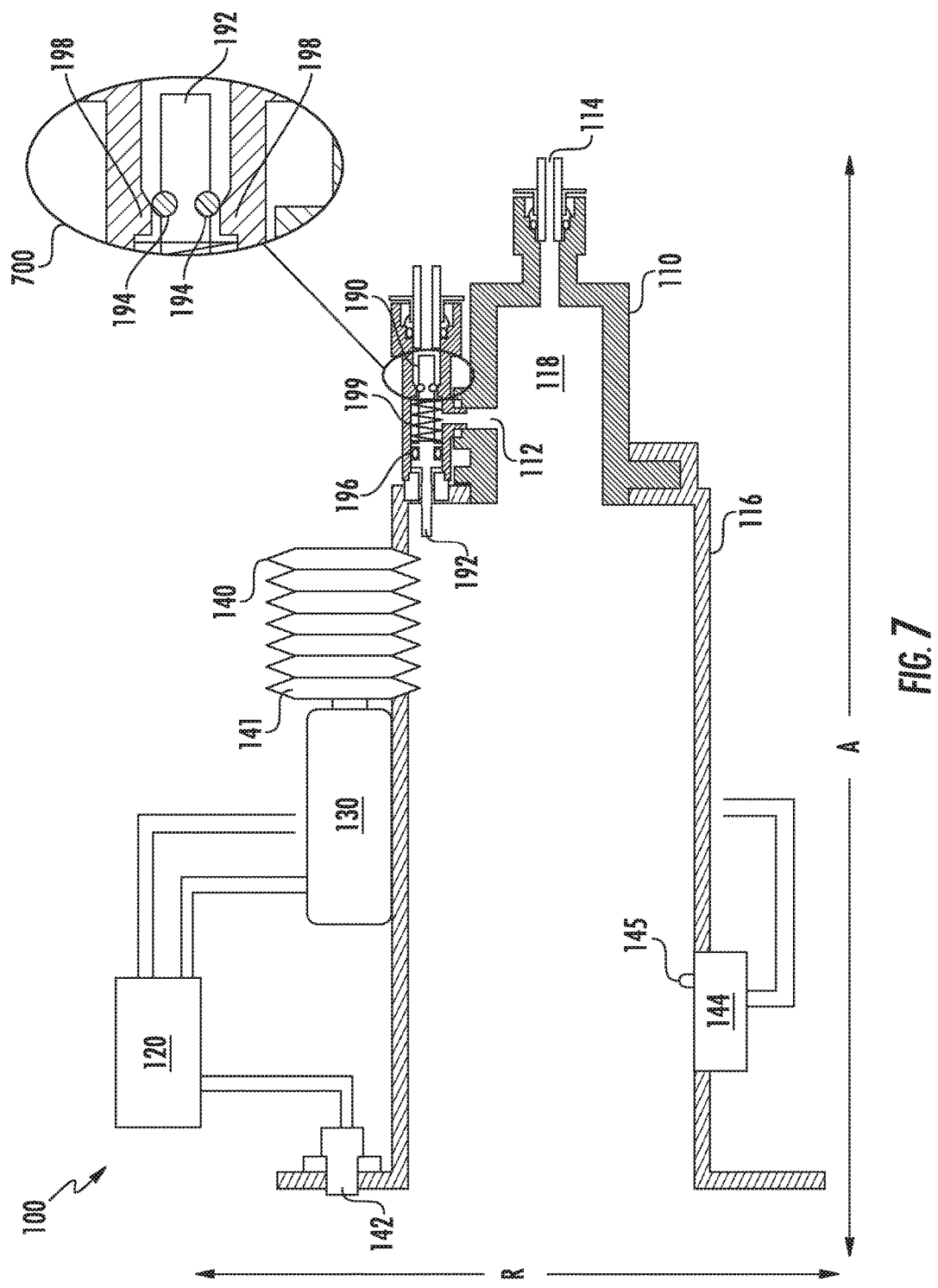
FIG. 7 provides a sectional view of the exemplary filter assembly of FIG. 3 with the filter cartridge removed and a check valve of the exemplary filter assembly in a closed position.
Figure 8:
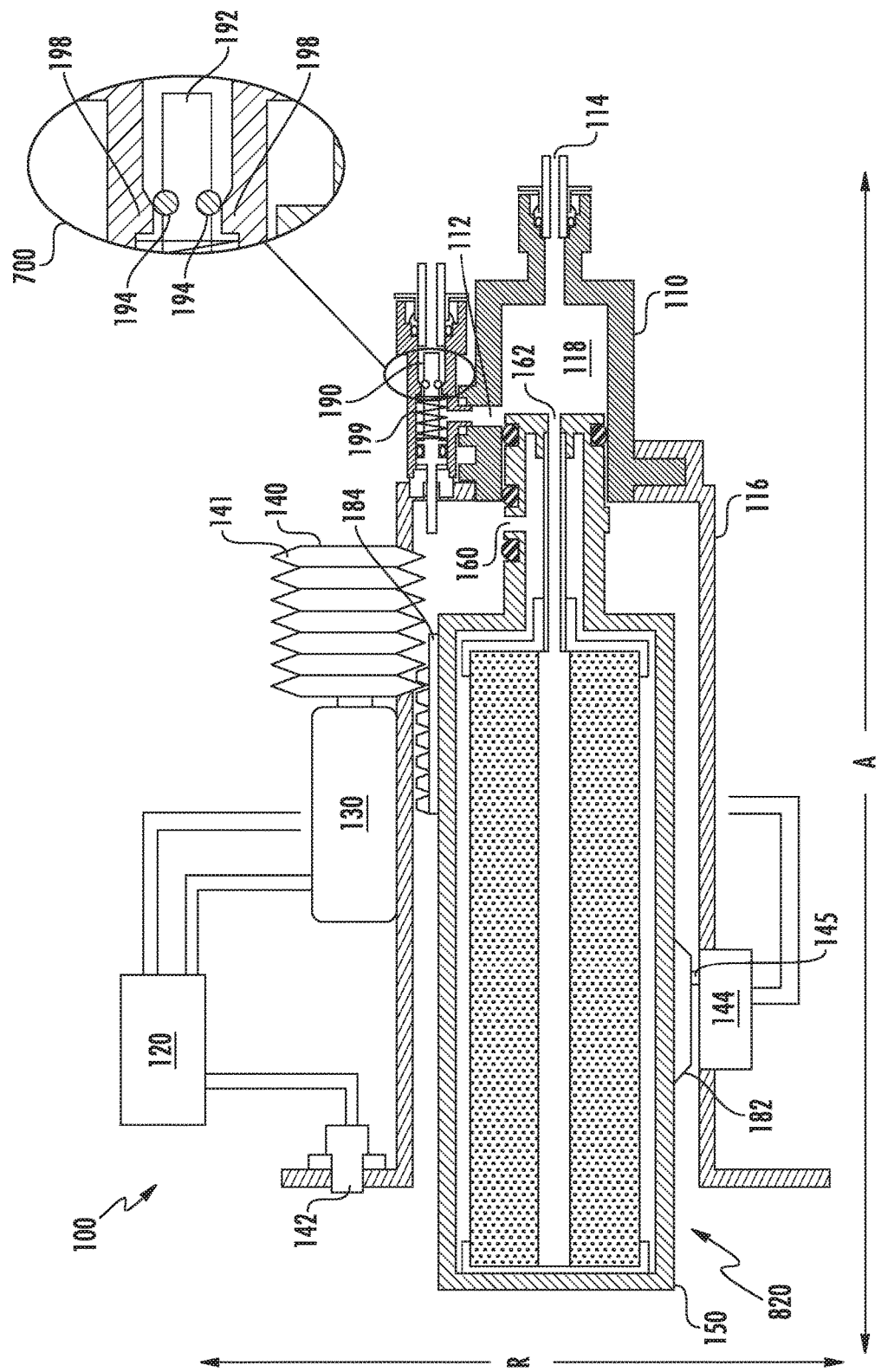
FIG. 8 provides a sectional view of the exemplary filter assembly of FIG. 3 with the filter cartridge in a first position.
Figure 9:
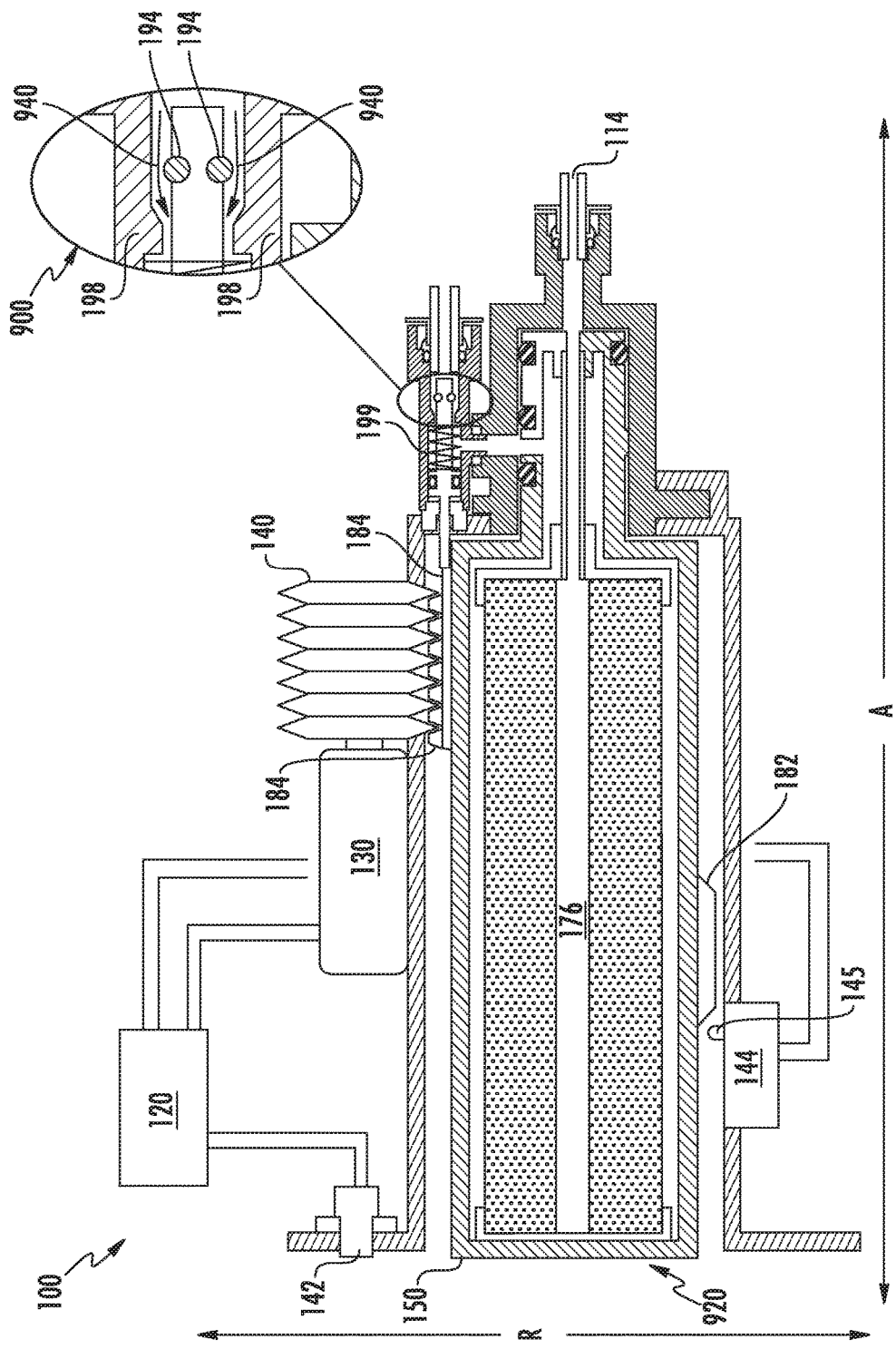
FIG. 9 provides a sectional view of the exemplary filter assembly of FIG. 3 with the filter cartridge in a second position and the check valve of the exemplary filter assembly in an open position.

Referring now to FIGS. 7-9, filter assembly 100 includes a check valve 190 having a shaft 192, radial seals 194 and 196, a valve seat 198, and a spring 199. As shown, check valve 190 is positioned upstream from inlet 112 of manifold 110 and, as will be discussed below in more detail, moves along axial direction A between a closed position 700 and an open position 900 depending upon the position of filter cartridge 150 relative to manifold 110. Radial seals 194 and 196 encircle an outer surface of shaft 192 and may be formed from a rubber material. Spring 199 may be positioned between seal members 194 and 196 along axial direction A, and may compress or decompress as check valve 190 moves between open and closed positions 900 and 700, respectively. Spring 199 urges check valve 190 towards the closed position. Thus, check valve 190 may be a normally closed check valve, in certain exemplary embodiments.

In FIG. 7, check valve 190 is shown in closed position 700, because filter cartridge 150 is removed from housing 116. More specifically, radial seal 194 is shown seated against valve seat 198 along axial direction A to prevent a flow of water from water supply to inlet 112 of manifold 110. In FIG. 8, filter cartridge 150 is shown in a first position 820 in which filter cartridge 150 is spaced apart from manifold 110 along axial direction A. More specifically, inlet 160 of filter cartridge 150 and inlet 112 of manifold 110 are not in fluid communication. Further, outlet 162 of filter cartridge 150 and outlet 114 of manifold 110 are also not in fluid communication. As such, when filter cartridge 150 is in first position 820, check valve 190 remains in closed position 700 to prevent flow of water from water supply to inlet 112 of manifold 110.

In FIG. 9, check valve 190 is shown in open position 900, because filter cartridge 150 is shown in a second position 920 in which neck portion 156 of filter cartridge 150 is positioned within cavity 118. More specifically, in second position 920, inlet 160 of filter cartridge 150 and inlet 112 of manifold 110 are in fluid communication along radial direction R. Further, outlet 162 of filter cartridge 150 and outlet 114 of manifold 110 are in fluid communication along axial direction A. As such, when filter cartridge 150 is in second position 920, check valve 190 is in the open position 900 to permit flow of water 940 from water supply to inlet 112 of manifold 110.

Referring again to FIGS. 7-9, input device 142 and sensor 144 of filter assembly 100 may be used to automatically remove filter cartridge 150 from manifold 110. As shown, input device 142 is a press-button switch that generates an interrupt each time a user presses the button. Further, upon receiving the interrupt from input device 142, controller 120 activates electric motor 130 to move filter cartridge 150 along axial direction A. More specifically, electric motor 130 rotates output shaft 132 to mesh gear 140 with gear rack 184 and move filter cartridge 150 from second position 920 to first position 820 along axial direction A.

As filter cartridge 150 moves from second position 920 to first position 820, check valve 190 moves from open position 900 to closed position 700. In particular, gear rack 184 may become spaced apart from shaft 192 along axial direction A such that spring 199 decompresses and allows check valve 190 to move from open position 900 to closed position 700 along axial direction A. In closed position 700, radial seal 194 is seated against valve seat 198 to prevent flow of water from water supply to inlet 112 of manifold 110.

When filter cartridge 150 is in first position 820, plunger 145 of sensor 144 is depressed along radial direction R, e.g., by raised portion 182 of casing 152. Further, sensor 144 generates an interrupt or signal until plunger 145 is no longer depressed by raised portion 182. Still further, while sensor 144 generates the interrupt or signal, controller 120 activates electric motor 130 to move filter cartridge 150 along axial direction A away from manifold 110. More specifically, electric motor 130 rotates output shaft 132 to mesh gear 140 with gear rack 184 and move filter cartridge 150 along axial direction A. As gear 140 and gear rack 184 continue to mesh, filter cartridge 150 continues to move away from manifold 110 along axial direction A until plunger 145 is no longer depressed by raised portion 182 along radial direction R. More specifically, when plunger 145 is no longer depressed by raised portion 182, sensor 144 stops generating the interrupt or signal, and controller 120 deactivates electric motor 130.

Referring now to FIGS. 8 and 9, sensor 144 of filter assembly 100 may be used to automatically install filter cartridge 150 in manifold 110. In one embodiment, raised portion 182 of casing 152 may depress plunger 145 along radial direction R as filter cartridge 150 moves along axial direction A towards cavity 118 of manifold 110. Further, sensor 144 may generate an interrupt while plunger 145 is depressed, and controller 120 may, while receiving the interrupt from sensor 144, activate electric motor 130 to rotate output shaft 132. More specifically, electric motor 130 may rotate output shaft to mesh gear 140 with gear rack 184 and move filter cartridge 150 along axial direction A towards cavity 118 of manifold 110.

Further, as filter cartridge 150, specifically neck portion 156 of casing 152, moves into cavity 118, check valve 190 moves from closed position 700 to open position 900. In particular, gear rack 184 moves shaft 192 along axial direction A such that spring 199 compresses and allows check valve 190 to move from closed position 700 to open position 900 along axial direction A. Still further, filter cartridge 150 may, in some embodiments, be held in second position 920 by gear 140 and gear rack 184. More specifically, gear 140 and gear rack 184 may be self-locking such that gear rack 184 cannot rotate gear 140. As such, filter cartridge 150 cannot move along axial direction A unless gear 140 is rotated by electric motor 130.

Figure 11:
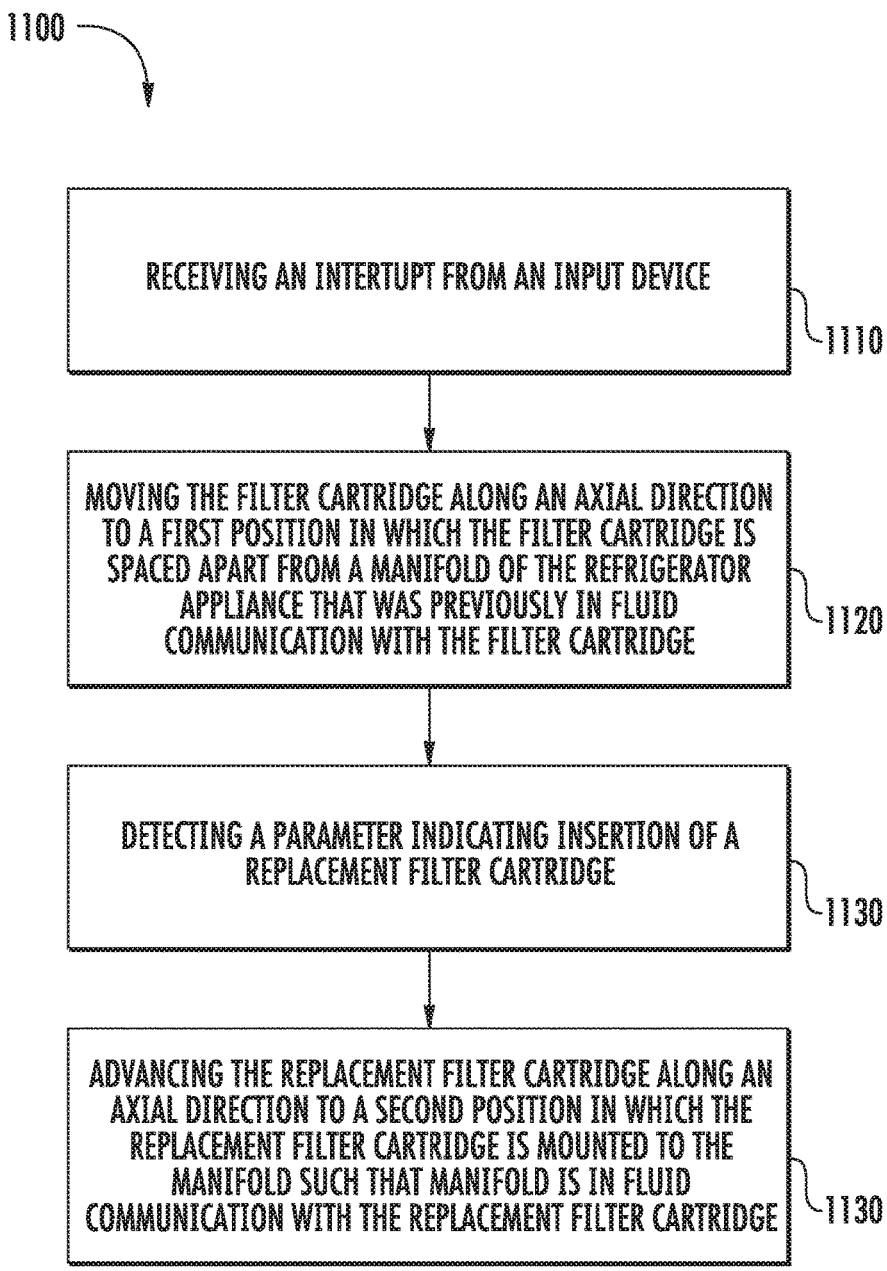
FIG. 11 illustrates a flow diagram of one embodiment of a method for replacing a filter cartridge of a refrigerator appliance in accordance with exemplary aspects of the present subject matter.

Referring now to FIG. 11, a method 1100 for replacing a filter cartridge of a filter assembly for a refrigerator appliance 10 in accordance with the present subject matter is provided. In general, the method 1100 will be discussed herein with reference to the filter cartridge discussed above with reference to FIGS. 4-6 and the filter assembly described above with reference to FIGS. 7-9. However, it should be appreciated by those of ordinary skill in the art that the disclosed method 1100 may generally be implemented with filter cartridges having any other suitable configuration and/or with filter assemblies having any other suitable configuration. In addition, although FIG. 11 depicts steps performed in a particular order for purposes of illustration and discussion, the methods discussed herein are not limited to any particular order or arrangement. One of ordinary skill in the art, using the disclosures provided herein, will appreciate that various steps of the method disclosed herein can be omitted, rearranged, combined, and/or adapted in various ways without deviating from the scope of the present disclosure.

As shown in FIG. 11, at (1110), the method 1100 includes a controller 130 receiving an interrupt or signal from an input device 142. As an example, a user of filter assembly 100 may actuate input device 142 to generate an interrupt or signal. In response to the interrupt or signal, controller 120 may, at (1120), activate electric motor 130 to move filter cartridge 150 along an axial direction A to a first position 820 in which filter cartridge 150 is spaced apart from a manifold 110 of refrigerator appliance 10 that was previously in fluid communication with filter cartridge 150. More specifically, electric motor 130 may rotate a gear 140 coupled to an output shaft 132 of electric motor 130 such that gear 140 meshes with a gear rack 184 of filter cartridge 150. As gear 140 and gear rack 184 mesh, rotational motion of gear 140 may be transferred to gear rack 184, and may be used to move filter cartridge 150 along axial direction A towards first position 820.

As filter cartridge 150 moves along axial direction A towards first position 820, filter cartridge 150 activates a sensor 144. More specifically, a raised portion 182 of filter cartridge 150 may depress a plunger 145 of sensor 144 along a radial direction R that is perpendicular to axial direction A. Still further, while raised portion 182 depresses plunger 145 along radial direction R, sensor 144 may generate an interrupt or signal. In response to the interrupt or signal from sensor 144, controller 120 continues to activate electric motor 130, and filter cartridge 150 continues to move along axial direction A until plunger 145 is no longer depressed by raised portion 182 of filter cartridge 150 along radial direction R. Additionally, once plunger 145 of sensor 144 is no longer depressed by raised portion 182 of filter cartridge 150, sensor 144 ceases generating the interrupt or signal, and controller 120 deactivates electric motor 130.

At (1130), sensor 144 may detect a parameter indicating a replacement filter cartridge has been inserted into housing 116 of filter assembly 100. More specifically, sensor 144 may generate an interrupt or signal when replacement filter cartridge depresses plunger 145 of sensor 144 along radial direction R. In response to the interrupt or signal from sensor 144, controller 120 may, at (1140), operate electric motor 130 to mount replacement filter cartridge to manifold 110. More specifically, electric motor 130 may move replacement filter cartridge along axial direction A to a second position 920 in which an inlet 160 of replacement filter cartridge is in fluid communication with an inlet of manifold 112. Also, in second position 920, an outlet 162 of replacement filter cartridge is in fluid communication with outlet 114 of manifold 110 such that filtered water can exit replacement filter cartridge and flow downstream to ice maker 52 and/or dispenser 54 of refrigerator appliance 10.

It should be appreciated that for the method of FIG. 11, the replacement filter cartridge is in accordance with the filter cartridge of the present disclosure. For example, the replacement filter cartridge may be the filter cartridge 150 described above with reference to FIG. 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly defining an axial direction, the filter assembly comprising:
   a manifold having an inlet port and an outlet port;
   a filter cartridge comprising a casing, a gear rack, a filter medium, an inlet port and an outlet port, the gear rack coupled to the casing, the filter medium disposed within the casing; and
   an electric motor coupled to a gear, the electric motor configured to move the filter cartridge along the axial direction by rotating the gear such that the gear meshes with the gear rack,
   wherein the filter cartridge is movable with the electric motor to a first position in which the filter cartridge is spaced apart from the manifold such that the inlet port of the filter cartridge is not in fluid communication with the inlet port of the manifold, and the outlet port of the filter cartridge is not in fluid communication with the outlet port of the manifold, and
   wherein the filter cartridge is also movable with the electric motor to a second position in which the filter cartridge is mounted to the manifold such that the inlet port of the filter cartridge is in fluid communication with the inlet port of the manifold, and the outlet port of the filter cartridge is in fluid communication with the outlet port of the manifold.

2. The filter assembly of claim 1, further comprising a check valve on the manifold such that the check valve is positioned upstream from the inlet of the manifold, the check valve movable along the axial direction as the filter cartridge moves between the first position and the second position.

3. The filter assembly of claim 2, wherein the check valve is in a closed position when the filter cartridge is in the first position, and wherein the check valve is in an open position when the filter cartridge is in the second position.

4. The filter assembly of claim 3, wherein the check valve includes a spring, the spring compressed along the axial direction when the check valve is in the open position, the spring decompressed along the axial direction when the check valve is in the closed position.

5. The filter assembly of claim 1, wherein the gear is coupled to an output shaft of the electric motor.

6. The filter assembly of claim 1, wherein the electric motor is a reversible electric motor configured to rotate the gear in two, opposite directions.

7. The filter assembly of claim 1, further comprising a controller operatively coupled to the electric motor such that the controller selectively activates the motor.

8. The filter assembly of claim 7, further comprising an input device operatively coupled to the controller such that the controller activates the electric motor in response to an interrupt from the input device.

9. The filter assembly of claim 8, wherein the electric motor moves the filter cartridge to the first position.

10. The filter assembly of claim 7, wherein the casing includes a raised portion that extends outwardly from a cylindrical, outer surface of the casing.

11. The filter assembly of claim 10, further comprising a sensor positioned along the axial direction, the sensor operable to detect movement of the filter cartridge along the axial direction.

12. The filter assembly of claim 11, wherein the sensor is operatively coupled to the controller such that the controller causes the electric motor to rotate in response to an interrupt from the sensor.

13. The filter assembly of claim 12, wherein the electric motor rotates and moves the filter cartridge to the second position while the controller receives the interrupt from the sensor.

14. A refrigerator appliance, comprising:
a cabinet defining a chilled chamber;
a filter assembly mounted to the cabinet, the filter assembly comprising a manifold having an inlet port and an outlet port;
a filter cartridge comprising a casing, a gear rack, a filter medium, an inlet port and an outlet port, the gear rack coupled to the casing, the filter medium disposed within the casing; and
an electric motor coupled to a gear, the electric motor configured to linearly move the filter cartridge along an axial direction by rotating the gear such that the gear meshes with the gear rack,
wherein the filter cartridge is movable with the electric motor to a first position in which the filter cartridge is spaced apart from the manifold such that the inlet port of the filter cartridge is not in fluid communication with the inlet port of the manifold, and the outlet port of the filter cartridge is not in fluid communication with the outlet port of the manifold, and
wherein the filter cartridge is also movable with the electric motor to a second position in which the filter cartridge is mounted to the manifold such that the inlet port of the filter cartridge is in fluid communication with the inlet port of the manifold, and the outlet port of the filter cartridge is in fluid communication with the outlet port of the manifold.

15. The refrigerator appliance of claim 14, wherein the manifold defines a cavity, and wherein a neck portion of the casing is received into the cavity when the filter cartridge moves to the second position.

16. The refrigerator appliance of claim 15, wherein the neck portion of the casing defines the inlet and outlet of the filter cartridge.

17. The refrigerator appliance of claim 16, wherein the gear and gear rack are self-locking such that the gear rack cannot rotate the gear, and wherein filter cartridge is held in second position by the gear and gear rack.

18. A method for replacing a filter cartridge of a refrigerator appliance, the method comprising:
receiving an interrupt from an input device, the input device operatively coupled to a controller configured to move the filter cartridge in response to the interrupt;
moving the filter cartridge along an axial direction to a first position in which the filter cartridge is spaced apart from a manifold of the refrigerator appliance that was previously in fluid communication with the filter cartridge, the controller operatively coupled to an electric motor configured to linearly move the filter cartridge along the axial direction;
detecting a parameter indicating insertion of a replacement filter cartridge, the controller operatively coupled to a sensor positioned along the axial direction and configured to generate the parameter in response to the replacement filter cartridge moving towards the manifold along the axial direction; and
advancing the replacement filter cartridge along the axial direction to a second position in which the replacement filter cartridge is in fluid communication with the manifold, the controller configured to activate the electric motor in response to detecting the parameter indicating insertion of the replacement filter cartridge.

19. The method of claim 18, wherein moving the filter cartridge along the axial direction to the first position includes moving a check valve positioned upstream of a water inlet of the manifold, the check valve movable to a closed position such that water cannot flow into the water inlet.

20. The method of claim 19, wherein advancing the replacement filter cartridge along the axial direction to the second position includes moving the check valve to an open position such that water flows into the water inlet.

* * * * *